United States Patent
Wait et al.

(10) Patent No.: US 7,254,289 B2
(45) Date of Patent: Aug. 7, 2007

(54) SYSTEM AND METHOD TO MINIMIZE MODULATION INSTABILITY

(75) Inventors: Peter C. Wait, Salisbury (GB); Arthur H. Hartog, Southampton (GB)

(73) Assignee: Schlumberger Technology Corporation, Sugar Land, TX (US)

(*) Notice: Subject to any disclaimer, the term of this patent is extended or adjusted under 35 U.S.C. 154(b) by 87 days.

(21) Appl. No.: 10/539,144

(22) PCT Filed: Dec. 11, 2003

(86) PCT No.: PCT/GB03/05372

§ 371 (c)(1),
(2), (4) Date: Jun. 16, 2005

(87) PCT Pub. No.: WO2004/057780

PCT Pub. Date: Jul. 8, 2004

(65) Prior Publication Data

US 2006/0115203 A1   Jun. 1, 2006

(30) Foreign Application Priority Data

Dec. 20, 2002  (GB) .................................. 0229633.3

(51) Int. Cl.
*G02B 6/00* (2006.01)

(52) U.S. Cl. .......................................... 385/12; 385/13

(58) Field of Classification Search ................ None
See application file for complete search history.

(56) References Cited

U.S. PATENT DOCUMENTS

| | | | | |
|---|---|---|---|---|
| 5,140,452 A | * | 8/1992 | Yamamoto et al. | 398/142 |
| 5,724,126 A | * | 3/1998 | Nishi et al. | 356/73.1 |
| 6,698,919 B2 | * | 3/2004 | Chi et al. | 374/45 |
| 2004/0118997 A1 | * | 6/2004 | Lehmann et al. | 250/227.14 |

OTHER PUBLICATIONS

M. N. Alahbabi et al. Influence of modulation instability on distributed optical fiber sensors based on spontaneous Brillouin scattering. J. Opt. Soc. Am. B, vol. 21 No. 6, pp. 1156-1160, Jun. 2004.*
D. Alasia et al. Detrimental effect of modulation instability on distributed optical fibre sensors using stimulated Brillouin scattering. Proc. SPIE vol. 5855, pp. 587-590, May 2005.*

* cited by examiner

*Primary Examiner*—Sung Pak
*Assistant Examiner*—Mike Stahl
(74) *Attorney, Agent, or Firm*—Clarence E. Eriksen; Dona C. Edwards; Bryan P. Galloway

(57) ABSTRACT

The present invention comprises the use of a fiber in a sensing optical fiber system operated in a region of negative chromatic dispersion to minimize modulation instability thereby enabling the identification and measurement of the information-carrying signals. The present invention may be used in a variety of sensing environments.

8 Claims, 2 Drawing Sheets

SYSTEM AND METHOD TO MINIMIZE MODULATION INSTABILITY

BACKGROUND

The invention generally relates to the use of fiber optic sensors in a variety of environments. More particularly, the invention relates to the use of such sensors in a way which corrects the modulation instability that is generated when greater amounts of power are launched into the relevant fiber.

A distributed fiber optic sensor enables a measurand (usually temperature) to be characterised along the length of the fiber as a continuous function of distance. Distributed temperature sensors are used in the following industries and processes: oil well production, electrical power cables, industrial processes, pipelines, fire alarms and tunnels.

In optical time domain reflectometry (OTDR) type sensors, a short pulse of light is launched into the sensing fiber. As the pulse propagates along the fiber a small fraction of light is scattered back towards the sending end. The processing electronics measures the characteristics of the backscattered light as a function of time relative to the input pulse. As the propagation time of the light is known, the perturbations of its characteristics may be spatially resolved along the fiber.

In Brillouin OTDR (BOTDR) the light scattered back is as a result of Brilloulin scattering. Both the intensity and frequency shift of the Brillouin scattered light are dependent oil temperature and strain. Therefore by analysing these parameters it is possible to realise a distributed temperature and/or strain sensor.

The performance of OTDR type sensors is critically dependent on the signal-to-noise ratio (S/N) at the receiver which is directly dependent on the power of the launched pulse. The upper limit to the power of the launched pulse is determined by the onset of non-linear effects in the fiber. For BOTDR systems the first nonlinear effect which degrades system performance as the pulse power is increased is that known as modulation instability. Modulation instability is a result of the intense electric field of the optical pulse causing a change in the refractive index of the fiber. This causes a change in the phase of the light, effectively modulating it and results in the generation of sideband signals. The sidebands then interfere at the receiver with the wanted Brillouin signals and degradation of the S/N occurs leading to possible inaccuracies in the measurements.

Other types of fiber optic sensing systems are also susceptible to modulation instability. These include Raman OTDR systems, Brillouin or Raman optical frequency reflectometry systems, fiber Bragg grating systems, interferometric systems, polarimetric systems, intensity systems, and distributed, single-point, or multi-point systems.

The prior would therefore benefit from a fiber optic sensing system in which optical signals of greater power can be launched into the relevant fiber without the onset of modulation instability.

Thus, there exists a continuing need for an arrangement and/or technique that addresses one or more of the problems that are stated above.

SUMMARY

According to a first aspect, the present invention comprises a fiber optic sensing system for use in a remote location, comprising: an optical fiber adapted to carry an optical signal from a starting location towards a remote location; the fiber adapted to transmit at least one information-carrying signal from the remote location towards the starting location; the information-carrying signal carrying information related to a parameter that is sensed in the remote location; the fiber operated in a region of negative chromatic dispersion; and the optical signal being at a power level sufficient to generate modulation instability if the fiber were operated in a region of positive chromatic dispersion.

According to a second aspect, the invention is a method for sensing a parameter in a remote location, comprising: providing a fiber; carrying an optical signal through the fiber from a starting location towards a remote location; operating the fiber in a region of negative chromatic dispersion; carrying the optical signal at a power level sufficient to generate modulation instability if the fiber were operated in a region of positive chromatic dispersion sensing a parameter in the remote location; and transmitting at least one information-carrying signal through the fiber from the remote location towards the starting location, the information-carrying signal carrying information related to the parameter.

DETAILED DESCRIPTION

A more detailed explanation of modulation instability will first be provided followed by the present invention's system and method to minimize such instability.

Optical fibers exhibit what is known as chromatic dispersion. Chromatic dispersion is the derivative of the transit time of an optical pulse with respect to wavelength. In turn, this phenomenon is caused by the refractive index changing with wavelength. A second effect, the Kerr effect, modifies the refractive index as a function of the power density in the core of the fiber. When the refractive index change caused by the Kerr effect matches the chromatic dispersion, then small variations in power become amplified and ultimately result in a chaotic signal with increasingly wide sidebands (see 22 in FIG. 1 and further explanation below) as the power level and the fiber length increase ("modulation instability"). Modulation instability results from four-wave mixing, where the phase matching is provided by the non-linear changes in refractive index compensating chromatic dispersion. Modulation instability only occurs in a wavelength region where chromatic dispersion has a positive sign. It should also be noted that, in the positive dispersion region, the most effective modulation instability occurs where the dispersion is small, since only low levels of Kerr-non-linearity are needed to compensate the dispersion in this case. The phenomenon of modulation instability is well known in telecommunications and is described further by G. P. Agrawal in "Non-linear Fiber Optics" Academic Press, 1989, ISBN 0-12-045140-9.

Figure 1:
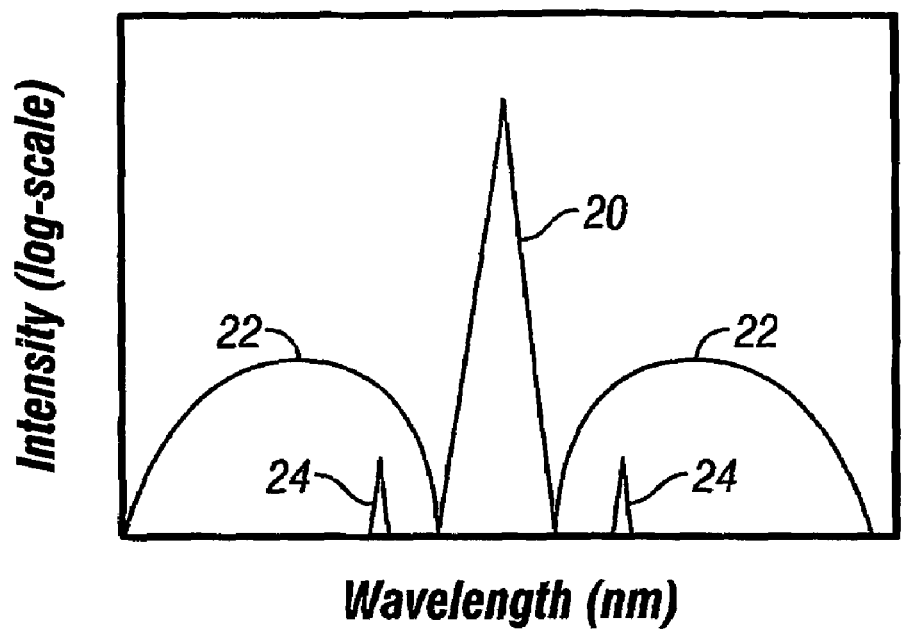
FIG. 1 is a plot of the spectrum of the optical signal using a prior art fiber optic sensor and system.

FIG. 1 illustrates the problems encountered with modulation instability specially when the relevant fiber is used to transmit sensing information. FIG. 1 shows a plot of the spectrum of the optical signal (intensity in log-scale versus wavelength) at a given power setting using a prior art fiber optic sensor and system, such as Corning's SMF 28. FIG. 1 shows at 20 the highest power that is launched into the relevant optical fiber. This peak power 20 is great enough to cause the onset of modulation instability in the fiber, as described above. The modulation instability, in turn, causes the sidebands 22 to be generated at either side of the peak power 20. The sidebands 22 obstruct the measurement of the smaller and information-carrying signals 24, such as the Brillouin peaks shown in FIG. 1. Other information-carrying signals, such as Raman scattering, may also be affected by the sidebands 22. The information-carrying signals 24 include the information that relates to the parameter that is sensed by the fiber optic sensing system. Thus, in order to measure the information-carrying signals 24, the sidebands 22 should be greatly reduced if not eliminated.

As previously discussed, modulation instability only occurs in a wavelength region where chromatic dispersion has a positive sign. The present invention thus avoids the effect of modulation instability by operating a single mode fiber sensor in the region of negative chromatic dispersion. In essence, the present invention comprises a fiber optic sensing system that greatly reduces the sidebands 22 thereby allowing the proper measurement of the information-carrying signals 24. There are various ways this can be achieved.

In one embodiment, the fiber optic sensor system is operated at wavelengths shorter than the wavelength of zero dispersion in conventional single-mode fiber. For instance, Corning's SMF 28 optical fiber has a wavelength of zero chromatic dispersion ($\lambda_0$) of approximately 1311 nanometers. It follows that operating the sensing system at a wavelength shorter than $\lambda_0$ but longer than the cut-off wavelength of the second mode (typically 1260 nanometers) prevents the onset of modulation instability.

In another embodiment, the fiber optic sensor system is operated in the region where the loss of silica fibers is at their lowest (i.e. in the vicinity of 1550 nm) and in this case conventional fibers (in which chromatic dispersion is positive at this wavelength) leads to the modulation instability problem. However, by selecting an optical fiber in which the design characteristic has been shifted to wavelengths well beyond the target operating wavelength, modulation instability can be avoided, even at 1550 nm. Such fibers can be constructed by tailoring the refractive index profile, for example to increase the waveguide dispersion contribution to chromatic dispersion. These fibers are commonly referred to as dispersion shifted fibers.

Figure 2:
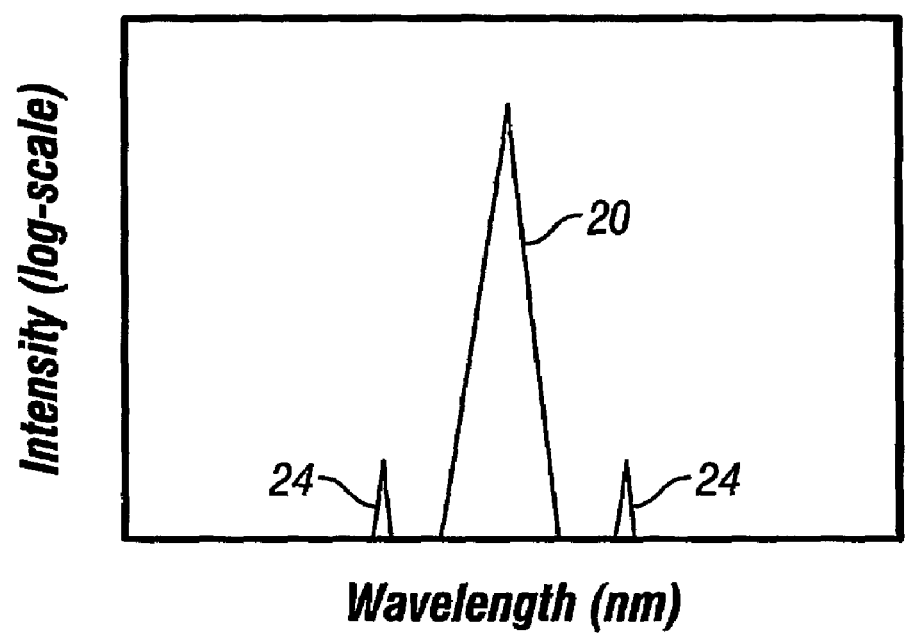
FIG. 2 is a plot of the spectrum of the optical signal (decibel versus wavelength) at a similar power setting as that of FIG. 1 using a dispersion shifted fiber.

One type of dispersion shifted fiber is Corning's Metro-Cor optical fiber. FIG. 2 shows a plot of the spectrum of the optical signal (intensity in log-scale versus wavelength) at a similar power setting as that of FIG. 1 using a dispersion shifted fiber. As can clearly be seen, by use of the dispersion shifted fiber, the effect of modulation instability and therefore the sidebands 22 can be greatly reduced, if not eliminated.

The present invention covers the use of a wide range of fiber optic sensing systems, including Raman or Brillouin OTDR systems, Brillouin or Raman optical frequency reflectometry systems, fiber Bragg grating systems, interferometric systems, polarimetric systems, intensity systems, and distributed, single-point, or multi-point systems, although it is most beneficial where the system design requires the transmission of high-power, narrow-band light.

In addition, as is known in the art, depending on the system and sensor used, the measurand to be sensed and characterized can comprise any of a number of parameters, including temperature, strain, pressure, distributed temperature, distributed strain, distributed pressure, flow, density, resistivity, acoustic pressure, acceleration, or chemical properties.

The fiber optic sensing system 10 of the present invention may be used when the relevant fiber is the sensor itself (such as in OTDR) or when the relevant fiber transmits the sensor information from an extrinsic sensor (such as when the fiber is connected to an external optical fiber sensor) or intrinsic sensor (such as when a fiber Bragg grating is written on the fiber).

Figure 3:
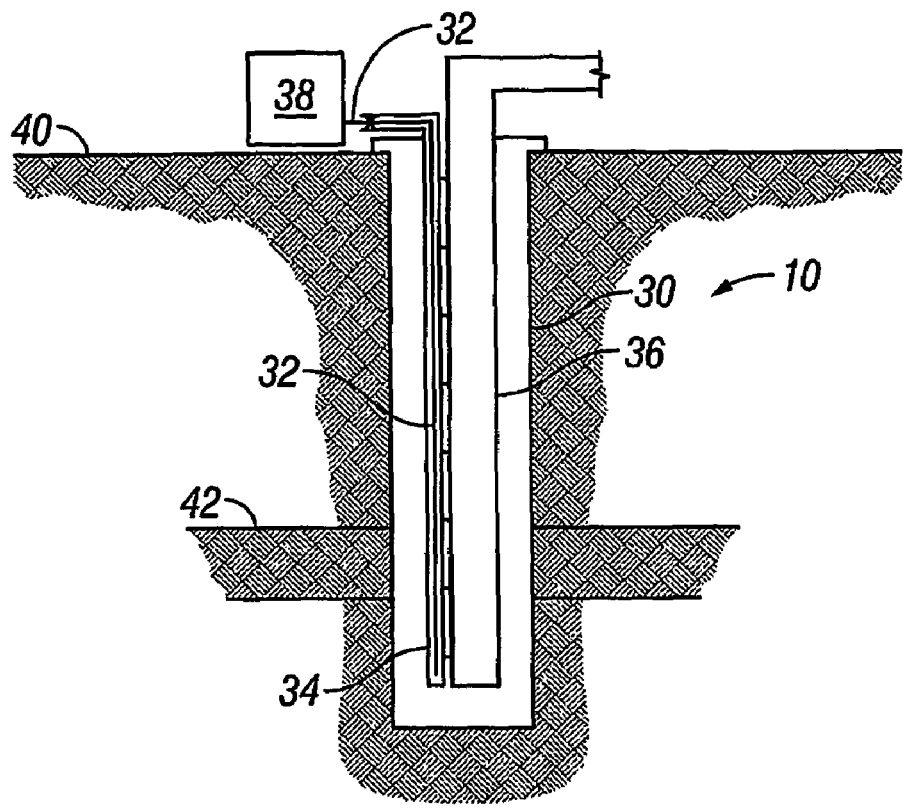
FIG. 3 is a schematic of the present invention used in a wellbore.

The fiber optic sensing system 10 of the present invention may be deployed in a wellbore 30 as shown in FIG. 3. A fiber 32, which may be a dispersion shifted fiber, may be deployed within a conduit 34 in the wellbore 30. The conduit 34, which can be a hydraulic control line, may be attached to a conveyance device 36, such as a production tubing or coiled tubing. The fiber 32 is optically connected to an opto-electronic unit 38 that may be located at the surface 40. The unit 38 launches the optical pulses through the fiber 32 and receives a return signal, such as backscattered light. As previously disclosed, the fiber optic sensing system 10 is operated in the region of negative chromatic dispersion (such as by employing one of the embodiments previously disclosed). Thus, the return signal will have greatly reduced sidebands 22 thereby allowing the unit 38 to measure and identify the information-carrying signals 24, such as Brillouin or Raman scattering. As is known in the art and as previously disclosed, the unit 38 provides a measurement of the relevant measurand (such as temperature, strain, or pressure) based on the reading of the information-carrying signals 24. For instance, if the measurand is distributed temperature, the unit 38 and fiber 32 provide a temperature profile along the length of fiber 32. The distributed temperature profile may be used by an operator for various purposes, such as to provide an indication of whether hydrocarbons are flowing from a formation 42 into the wellbore 30.

Figure 4:
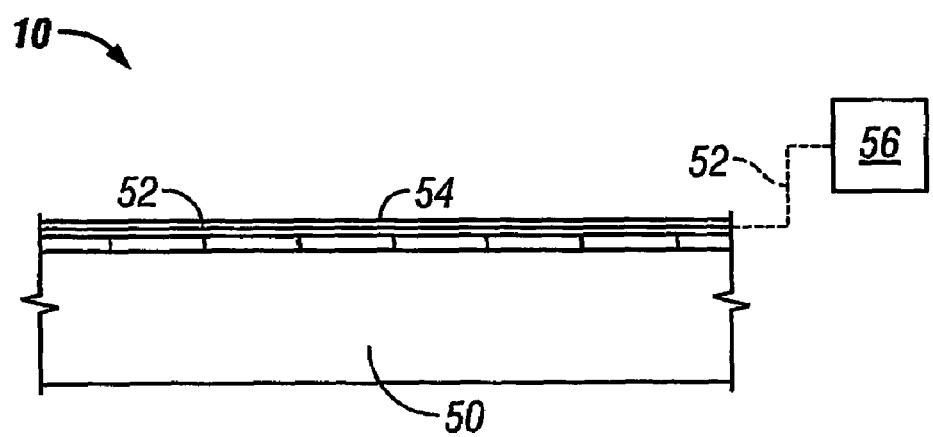
FIG. 4 is a schematic of the present invention used along a pipeline.

The present invention may also be used in conjunction with a pipeline 50 as shown in FIG. 4. A fiber 52, which may be a dispersion shifted fiber, may be deployed within a conduit 54 that is disposed along the pipeline 50. The conduit 54 may be attached to the pipeline 50. The fiber 52 is optically connected to an opto-electronic unit 56. The unit 56 launches the optical pulses through the fiber 52 and receives a return signal, such as backscattered light. As previously disclosed, the fiber optic sensing system 10 is operated in the region of negative chromatic dispersion (such as by employing one of the embodiments previously disclosed). Thus, the return signal will have greatly reduced sidebands 22 thereby allowing the unit 56 to measure and identify the information-carrying signals 24, such as Brillouin or Raman scattering. As is known in the art and as previously disclosed, the unit 56 provides a measurement of the relevant measurand (such as temperature, strain, or pressure) based on the reading of the information-carrying signals 24. If the unit 56 and fiber 52 provide a distributed temperature profile along the length of the fiber 52, the temperature profile may be used by an operator to identify the presence and location of any leaks along the pipeline 50.

Although a wellbore 30 and pipeline 50 example have been given, it is understood that the present invention including the fiber 32, 52 may be used in any other sensing environment (remote location). For instance, the present invention may be used in the following industries and processes: electrical power cables (to measure the performance of the cable), industrial processes (to measure the performance of the process), fire alarms and tunnels (to identify the presence of a fire), and civil engineering structures (to measure strain in a structure).

By reducing the effect of modulation instability, the present invention enables an operator to launch pulses over greater distances than prior art systems, and thereby enables an operator to sense a particular measurand over greater distances.

It is noted that in those embodiments in which a conduit 34, 54 houses the fiber 32, 52, the fiber 32, 52 may be pumped into the conduit 34, 54 by use of fluid drag. Essentially, the fiber 32, 53 is dragged through the conduit 34, 54 by use of hydraulic fluid pressure that is injected into the conduit 34, 54. This pumping technique is described in U.S. Reissue Pat. 37,283, incorporated herein by reference.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention,

What is claimed is:

1. A fiber optic sensing system for use in a remote location, comprising:
   an optical fiber adapted to carry an optical signal from a starting location towards a remote location;
   the fiber adapted to transmit at least one information-carrying signal from the remote location towards the starting location;
   the information-carrying signal carrying information related to a parameter that is sensed in the remote location said parameter comprising at least one of temperature, strain, pressure, distributed temperature, distributed strain, distributed pressure, flow density, resistivity, acoustic pressure, acceleration, or chemical properties;
   the fiber operated in a region of negative chromatic dispersion; and
   the optical signal being at a power level sufficient to generate modulation instability in the fiber were operated in a region of positive chromatic dispersion.

2. The system of claim 1, wherein the fiber transmits the information-carrying signal from a sensor.

3. The system of claim 2, wherein the sensor is an intrinsic sensor.

4. The system of claim 2, wherein the sensor is an extrinsic sensor.

5. A method for sensing a parameter in a remote location, comprising:
   providing a fiber;
   carrying an optical signal through the fiber from a starting location towards a remote location;
   operating the fiber in a region of negative chromatic dispersion;
   carrying the optical signal at a power level sufficient to generate modulation instability if the fiber were operated in a region of positive chromatic dispersion;
   sensing a parameter in the remote location where the parameter comprises at least one of temperature, strain, pressure, distributed temperature, distributed strain, distributed pressure, flow density, resistivity, acoustic pressure, acceleration, or chemical properties; and
   transmitting at least one information-carrying signal through the fiber from the remote location towards the starting location, the information-carrying signal carrying information related to the parameter.

6. The method of claim 5, wherein the sensing step comprises sensing the parameter with a sensor and the transmitting step comprises transmitting the information-carrying signal from the sensor.

7. The method of claim 6, wherein the sensor is an internal sensor.

8. The method of claim 6, wherein the sensor is an external sensor.

* * * * *